United States Patent
Brandstätter

(10) Patent No.: US 9,590,821 B2
(45) Date of Patent: Mar. 7, 2017

(54) COMMUNICATION SYSTEM FOR TRANSMITTING DATA UNDER A TUNNEL PROTOCOL BETWEEN AT LEAST TWO DATA COMPUTERS VIA A WIDE AREA NETWORK AND A METHOD FOR RUNNING SUCH A COMMUNICATION SYSTEM

(71) Applicant: HOB GmbH & CO. KG, Cadolzburg (DE)

(72) Inventor: Klaus Brandstätter, Rosstal (DE)

(73) Assignee: HOB GMBH & CO. KG, Cadolzburg (DE)

( * ) Notice: Subject to any disclaimer, the term of this patent is extended or adjusted under 35 U.S.C. 154(b) by 0 days.

(21) Appl. No.: 14/598,339

(22) Filed: Jan. 16, 2015

(65) Prior Publication Data

US 2015/0229490 A1    Aug. 13, 2015

(30) Foreign Application Priority Data

Feb. 12, 2014    (EP) .................................... 14154843

(51) Int. Cl.
H04L 12/28    (2006.01)
H04L 12/46    (2006.01)
H04L 29/06    (2006.01)

(52) U.S. Cl.
CPC ........ H04L 12/4633 (2013.01); H04L 69/161 (2013.01); H04L 69/164 (2013.01); H04L 69/165 (2013.01); H04L 69/22 (2013.01)

(58) Field of Classification Search
CPC ..... H04L 63/029; H04L 69/161; H04L 69/18; H04L 69/22

(Continued)

(56) References Cited

U.S. PATENT DOCUMENTS 6,771,594 B1 *  8/2004  Upadrasta ......... H04L 29/06027
                                                        370/228
7,493,383 B1     2/2009  Mukerji
(Continued)

OTHER PUBLICATIONS

Jian-Ming Liao et al. "Analysis and Design of VPN Based on Wireless Android Intelligent Home Center", 2013 10th International Computer Conference on Wavelet Active Media Technology and Information Processing IEEE, pp. 251-254, (Dec. 2013).

Primary Examiner — Dmitry H Levitan
(74) Attorney, Agent, or Firm — Browdy and Neimark, PLLC

(57) ABSTRACT

A communication system for transmitting data under a tunnel protocol between at least two computers via a wide area network, said system comprises
 a first computer running a first user application and a virtual private network application to build up TCP and UDP tunnels,
 a second computer accordingly running a second user application and a virtual private network VPN application,
 a wide area network to which both computers are connected by physical connections, wherein both user applications are implemented to communicate for an IP data packet exchange via at least one of the TCP tunnels and the UDP tunnel using the TCP and/or UDP transport protocol based on according TCP, UDP and IP stacks on both computers, and
 a splitter which is at least one of implemented in and associated to at least one of both computers which splitter analyzes the IP data packets to be sent from one of the computers to the other computer as concerns the type of the IP data packets and directs IP data packets (Continued)

of the TCP type to be transmitted over a TCP tunnel and IP data packets of the UDP type to be transmitted over a UDP tunnel.

16 Claims, 4 Drawing Sheets

(58) Field of Classification Search
USPC .... 370/395.52, 431, 464, 465; 709/230–232, 709/238
See application file for complete search history.

(56) References Cited

U.S. PATENT DOCUMENTS

| | | | |
|---|---|---|---|
| 7,894,364 B2 | 2/2011 | Baron et al. | |
| 8,356,109 B2* | 1/2013 | Martinez | H04N 21/6125 709/231 |
| 2006/0235939 A1* | 10/2006 | Yim | H04L 63/029 709/217 |
| 2011/0141904 A1* | 6/2011 | Viger | H04L 47/196 370/241 |
| 2012/0005369 A1 | 1/2012 | Capone et al. | |
| 2015/0207834 A1* | 7/2015 | Zhao | H04N 21/631 709/231 |

* cited by examiner

COMMUNICATION SYSTEM FOR TRANSMITTING DATA UNDER A TUNNEL PROTOCOL BETWEEN AT LEAST TWO DATA COMPUTERS VIA A WIDE AREA NETWORK AND A METHOD FOR RUNNING SUCH A COMMUNICATION SYSTEM

CROSS-REFERENCE TO RELATED APPLICATIONS

This application claims the priority of Patent Application Serial No. EP 14 154 843.8 filed on 12 Feb. 2014, pursuant to 35 U.S.C. 119(a)-(d), the content of which is incorporated herein by reference in its entirety as if fully set forth herein.

FIELD OF THE INVENTION

The present invention refers to a communication system for transmitting data under a tunnel protocol between at least two computers via a wide area network, said system comprising a first computer running a first user application and a virtual private network application which is designed to build up TCP and UDP tunnels with according tunnel endpoints, a second computer running a second user application and a virtual private network VPN application which again is designed to build up TCP and UDP tunnels with according tunnel endpoints, and a wide area network to which both computers are connected by physical connections, wherein both user applications are implemented to communicate for an IP data packet exchange via at least one of the TCP tunnels and the UDP tunnel using the TCP and/or UDP transport protocol based on according TCP, UDP and IP stacks on both computers, and to a method for running such a communication system according to the invention.

BACKGROUND OF THE INVENTION

Before turning to the invention it is helpful to explain its background for better understanding. The field of the invention refers to the Transmission Control Protocol (TCP), which is one of the core protocols of the Internet protocol suite (TCP/IP). TCP provides reliable, ordered, error-checked delivery of a stream of bytes between programs running on computers connected to a local area network, intranet or the public Internet. Applications that do not require the reliability of a TCP connection may instead use the connectionless User Datagram Protocol (UDP), which emphasizes low-overhead operation and reduced latency rather than error checking and delivery validation.

TCP is a connection-oriented data transport protocol, meaning that two applications each running on a computer establish a session connection, before data can be exchanged. During session establishment also some protocol parameters may be negotiated. The data transport of a connection-oriented protocol like TCP is also reliable, meaning that lost data is retransmitted and that at the receiving end the data is delivered in the same order as it was sent by the sending application.

At the end of the data transfer, protocol elements are used to finish the session connection in an ordered manner. In contrast to TCP, UDP is a so called connection-less protocol.

A TCP/UDP/IP stack is part of a computer's so called networking stack, for example, part of Windows or Unix operating system, such as Linux. The TCP/UDP/IP stack is the piece of software which mainly handles the TCP/UDP/IP headers and builds the bridge between the computer's applications and the network interface.

A TCP stack terminates a TCP connection between two computers. In this context "termination" means that this is the endpoint of the TCP communication protocol. It does not mean close or end of the TCP connection.

An application software, running on a computer, communicates with the TCP/UDP stack using, for example, the Berkeley Sockets API (Application Programming Interface). The TCP/UDP/IP stack handles all network packets. These network packets can be sent and received over the public Internet and contain an IP header (e.g. defining the level version IPv4 or IPv6), a TCP/UDP header, and the payload data.

The application communicating with the TCP/UDP stack through the corresponding APIs does not receive the IP header or TCP/UDP header of received packets by the computer, but the payload data only. When sending data, only that data is given to the corresponding API function, while the TCP/UDP and IP headers are generated by the TCP/UDP/IP stack.

In the Berkeley Sockets API, used just as an example, the application uses initializing functions like "socket( )" and "bind( )". The TCP function "connect( )" is called to establish a connection to the other computer. To send data, the TCP function "send( )" is called, while the TCP function "recv( )" is called to receive data. Depending on the operation system, some type of a TCP function call of "close( )" is called to shut down a connection.

The TCP stack has the functionality that an application can switch between blocking mode and non-blocking mode. When blocking mode is used, the called API functions return only at the time when the TCP stack has done the required work. When non-blocking mode is used, all API function calls return immediately, but some mechanism is used so that the application is notified when the socket operation has completed. More sophisticated applications use non-blocking mode.

TCP is used widely on the public Internet, for example, for Web browsing. UDP is the preferred protocol for telephony communication, such as Voice over IP (VoIP).

On networks like the public Internet, when there is too much traffic, network packets are silently discarded. This is a very important feature of the Internet Protocol (IP), as this Internet protocol is not connection-oriented. If the Internet would use a connection-oriented protocol, such as the base application data transport protocol TCP, it would not be able to handle all the huge number of data packets sent through today's public Internet.

When on a TCP connection a packet is lost, the sending TCP stack does not get the acknowledge it waits for during a certain time, so it sends the lost packet again.

Of course, when packets are lost and are re-sent after a certain time, the number of data packets effectively sent over a TCP connection within a given period of time is much less compared to the possible maximum, so the connection gets slow and the overall speed suffers.

Further on a TCP stack, when sending packets, cannot send packets as fast as the speed of the connected communication line would allow. This would result in too much packet losses. Instead, a TCP stack starts slowly and monitors the connection to the partner computer. This mechanism is called "slow start".

When no packets are lost, the speed is increased. When packets are lost, the speed is reduced to a starting value. This happens all the time while data is sent over a TCP connection.

TCP stacks also implement the functionality of flow control. Flow control means, when the sending application tries to send data faster than the receiving application (on the other computer) receives and processes the data, the sending application is blocked, so it needs to wait.

This blocking of the sending application is done by means of the receiving TCP stack on the other computer. It still acknowledges the received data, but it sends a TCP status information which is called "zero window", notifying the sending TCP stack that it cannot receive more data at the moment.

Further on TCP connections are established by a so called "three-way handshake" between the two TCP stacks. This works as follows:

The TCP stack which wants to establish the connection with an application on a remote computer sends a TCP packet with the SYN bit set (synchronize sequence numbers) in the flags (control bits) of the TCP header (SYN packet). The remote TCP stack answers with SYN and ACK (acknowledgment) bits set in the flags of the TCP header. Then the first (client side) TCP stack sends an acknowledge (ACK) packet to finally establish the TCP connection.

When on the remote side no application is listening for the destination port in the first incoming TCP packet with SYN, the TCP stack answers with RST (reset the connection) so that no connection is established.

It may also happen that a client computer's TCP stack sends a SYN packet to an Internet address where there is no computer or the computer is not online. In this case, there is no answer to the SYN packet, and there is a timeout since no session can be established.

Fully transparent network access providing Virtual Private Network (VPN) tunnels can either use TCP or UDP as the transport layer protocol. They can also use other, non-connection-oriented, protocols, like IPsec (Internet Protocol Security), which in turn can also use UDP (User Datagram Protocol/NAT-T), ESP (Encapsulating Security Payload) or AH (Authentication Header).

When VPN tunnels use TCP as transport layer, the security protocol used is usually SSL (Secure Sockets Layer) or TLS (Transport Layer Security). In some implementations, SSH (Secure Shell) is used.

There are advantages and disadvantages when using TCP as connection-oriented protocol versus any other of the connection-less protocols.

Following advantages of TCP when used as a VPN tunnel protocol are worth to mention:
  TCP can mostly be used because it is not blocked by firewalls in hotels or hotspots. Firewalls need to allow TCP connections, namely e.g. TCP port 80 for HTTP and TCP port 443 for HTTPS because otherwise the users could not browse the Web.
  The data stream of TCP connections can be compressed far better as compared to connection-less protocols. When during a TCP connection a packet is lost, it is re-sent, and so a dictionary for compression (which needs to be identical on both sides) always has the correct content. In fact it is not possible, or at least not so easy and efficient, to use dictionaries for compression of multiple packets on connection-less protocols, since packets always can be lost in between.

Now the disadvantages of the TCP protocol when used as a VPN tunnel protocol are the following:
  There may be TCP meltdown. TCP connections inside the TCP VPN tunnel get slow since, due to the nature of the TCP stack, the inner TCP stack will not always send data when the outer TCP tunnel could send data.
  TCP is not well-situated for real time streaming applications such as audio (voice over IP) or video (movies). The reason is that when a packet of a connection-less protocol is lost from the real time stream, on the receiver side there is only a short disruption, nothing more. The lost packet is not re-sent and the user still can hear and understand the audio or video. When a packet of a TCP connection is lost, the sender does not get an acknowledge, it waits a certain time and sends the packet again.

All this results in a significant interruption of the data stream to the receiver leading e.g. to a perceivable disturbance of the audio reproduction on the receiver side.

BACKGROUND ART

In this connection US 2012/0005369 A1 discloses a tunneling mechanism used to aggregate payloads from the network protocol at or below the tunneling layer into a single packet. A user-space application establishes the TCP tunnel and encapsulates an end-to-end TCP payload into the TCP segment for transmission over a TCP connection. This enhanced TCP tunnel eliminates TCP meltdown and can be used over any network which supports TCP. The calling application either identifies the parameters of an existing TCP socket or establishes a new TCP socket. A modified transport layer uses the identified TCP connection in forming the enhanced TCP tunnel. The enhanced TCP tunnel manages the data transmission on the TCP stack to eliminate TCP meltdown. Summing up this known concept modifies the original TCP stacks built in on the sending and receiving computers to avoid TCP meltdown.

Another prior art document US 2006/0245414 A1 discloses a system, method and computer program product for communicating with a private network. An application of a client is monitored for communications intended for a node coupled to a private network. Such a communication may then be intercepted before the communication can be received by the transport layer of the client, the intercepted communication may then be sent with the connection identifier to an interface unit coupled to the private network via an established network connection over a public network. The connection identifier also associated with a communication link that is established over the private network between the interface unit and the node. The interface unit uses the connection identifier that is received with the communication to identify the associated communication link over the private network. The interface unit may then send the communication without the connection identifier to the node via the identified associated communication link. In this prior art reference TCP protocol data are not sent through the tunnel to avoid TCP meltdown, but a proprietary protocol is used, which thus needs to be implemented on both sides of the tunnel. This significantly limits the range of use of this system and method.

Now as concerns the problems underlying the present invention it is to be emphasized that in general the establishing and selection of TCP and/or UDP sessions between the user applications are to be improved especially as concerns a maximum data transmission rate over wide area networks, like the Internet, and the avoidance of a meltdown of TCP connections.

SUMMARY OF THE INVENTION

An object of the invention is to improve the establishing and selection of TCP and/or UDP sessions between two user applications avoiding the discussed prior art disadvantages of capacity limitations and meltdown problems.

This object is achieved by a communication system for transmitting data under a tunnel protocol between at least two computers via a wide area network, said system comprising a first computer running a first user application and a virtual private network application which is designed to build up TCP and UDP tunnels with according tunnel endpoints, a second computer running a second user application and a virtual private network VPN application which again is designed to build up TCP and UDP tunnels with according tunnel endpoints, a wide area network to which both computers are connected by physical connections, wherein both user applications are implemented to communicate for an IP data packet exchange via at least one of the TCP tunnel and the UDP tunnel using the TCP and/or UDP transport protocol based on according TCP, UDP and IP stacks on both computers, and a splitter implemented in at least one of both computers which splitter analyzes the IP data packets to be sent from one of the computers to the other computer as concerns the type of the IP data packets and directs IP data packets of the TCP type to be transmitted over a TCP tunnel and IP data packets of the UDP type to be transmitted over a UDP tunnel.

Generally this system according to the invention can build two parallel tunnels to encapsulate mainly TCP/IP and UDP/IP packets for a fully transparent network access, the first using TCP as tunnel protocol, the second using UDP as tunnel protocol.

Before any IP packet is sent into one of both tunnels, it is processed by the splitter, which evaluates this packet and on behalf of this decides which of both tunnels is best suited for this packet, to send it into the appropriate tunnel. Since both the TCP and the UDP tunnel have different characteristics with regards to encryption, compression, time delay and reliability, the splitter performs optimization for the summary of the communication sessions.

Preferred embodiments of the invention are those according to which the splitter is either implemented as a computer program executable on the at least one computer or in both computers between which data are transmitted under the TCP and/or UDP tunnel protocol.

At this point attention is drawn that to the fact that method aspects of the invention as described above are reflected in the corresponding method claims which are discussed further down the description.

According to another aspect the invention defines a communication system, wherein both user applications are implemented to communicate for an IP data packet exchange via at least the TCP tunnel connection using the TCP transport protocol based on according TCP stacks and IP stacks on both computers successfully avoiding a TCP meltdown problem in line with the object of the invention mentioned above. In this context it is to be emphasized that the following characterizing features of the invention according to this aspect might also be applied to a TCP tunnel connection independently from the splitter implemented in or associated to at least one of both computers which splitter analyzes the IP data packets to be sent from one of the computers to the other computer as concerns the type of the IP data packets and directs IP data packets of the TCP type to be transmitted over a TCP tunnel and IP data packets of the UDP type to be transmitted over a UDP tunnel, from the splitter implemented as a computer program executable on the at least one computer, or from the splitter implemented in both computers. The invention according to this aspect thus is defined in that an intermediate TCP stack unit including a tunnel-sided TCP stack and a user application-sided TCP stack, which are internally coupled by an internal communication connection, is implemented in at least one of the tunnel endpoints of the TCP tunnel between the TCP tunnel and the TCP stack of the according user application, the tunnel-sided TCP stack terminates at least one TCP session encapsulated by the TCP tunnel in the tunnel endpoint and provides for a data volume buffer, and a separate TCP data connection is present between the user application-sided TCP stack and the TCP stack of the user application which separate TCP data connection is controlled by the application-sided TCP stack depending on the data volume buffer status reported by the tunnel-sided TCP stack.

The system relevant concept of the intermediate TCP stack is the basis for providing for a separate TCP data connection between the TCP stack of the user application and the user application-sided TCP stack of the intermediate TCP stack unit which separate TCP data connection may not underlie the usual TCP restrictions of the slow start as discussed in the outset of this description thus avoiding the problem of a meltdown of the TCP tunnel connection.

Data processing relevant aspects of this general concept of the invention according to the above-described aspect are reflected by the method for running a communication system in which both user applications are implemented to communicate for an IP data packet exchange via at least the TCP tunnel using the TCP transport protocol based on according TCP stacks and IP stacks on both computers, wherein an intermediate TCP stack unit including a tunnel-sided TCP stack and a user application sided TCP stack, which are internally coupled by an internal communication connection, is implemented in at least one of the tunnel endpoints of the TCP tunnel between the TCP tunnel and the TCP stack of the according user application, wherein the tunnel-sided TCP stack terminates the at least one TCP session, encapsulated by the TCP tunnel in the tunnel endpoint and provides for a data volume buffer, and wherein a separate TCP data connection is present between the user application-sided TCP stack and the TCP stack of the user application which separate TCP data connection is controlled by the user application-sided TCP stack depending on the data volume buffer status reported by the tunnel-sided TCP stack, by the method for running a communication system in which intermediate TCP stack units are implemented at both endpoints of the TCP tunnel connection between both computers, and by a method for running a communication system in which the at least one intermediate TCP stack unit is implemented on a separate computer. Said method comprises the following method steps for avoiding meltdown of the TCP tunnel:

the TCP stack of the user application sends payload data to the user application-sided TCP stack of the intermediate TCP stack unit, the user application-sided TCP stack sends the payload data to the tunnel-sided TCP stack of the TCP stack unit, which payload data can be buffered by the tunnel-sided TCP stack and/or sent via the TCP tunnel depending on the data volume buffer status, the tunnel-sided TCP stack notifies to the user application-sided TCP stack when no more data can be accepted by the tunnel-sided TCP stack, the user application-sided TCP stack notifies to the TCP stack of the user application to stop sending payload data, the tunnel-sided TCP stack notifies to the user application-sided TCP stack when data can be accepted again, which data volume buffer status is further notified from the user application-sided TCP stack to the TCP stack of the user application, and the TCP stack of the user application restarts sending the payload data to the user application-sided TCP stack without reduced data rate.

The communication system in which both user applications are implemented to communicate for an IP data packet exchange via at least the TCP tunnel using the TCP transport protocol based on according TCP stacks and IP stacks on both computers, wherein an intermediate TCP stack unit including a tunnel-sided TCP stack and a user application sided TCP stack, which are internally coupled by an internal communication connection, is implemented in at least one of the tunnel endpoints of the TCP tunnel between the TCP tunnel and the TCP stack of the according user application, wherein the tunnel-sided TCP stack terminates the at least one TCP session, encapsulated by the TCP tunnel in the tunnel endpoint and provides for a data volume buffer, and wherein a separate TCP data connection is present between the user application-sided TCP stack and the TCP stack of the user application which separate TCP data connection is controlled by the user application-sided TCP stack depending on the data volume buffer status reported by the tunnel-sided TCP stack, and the communication system in which intermediate TCP stack units are implemented at both endpoints of the TCP tunnel connection between both computers are preferred embodiments of the communication system in which both user applications are implemented to communicate for an IP data packet exchange via at least the TCP tunnel using the TCP transport protocol based on according TCP stacks and IP stacks on both computers, wherein an intermediate TCP stack unit including a tunnel-sided TCP stack and a user application sided TCP stack, which are internally coupled by an internal communication connection, is implemented in at least one of the tunnel endpoints of the TCP tunnel between the TCP tunnel and the TCP stack of the according user application, wherein the tunnel-sided TCP stack terminates the at least one TCP session, encapsulated by the TCP tunnel in the tunnel endpoint and provides for a data volume buffer, and wherein a separate TCP data connection is present between the user application-sided TCP stack and the TCP stack of the user application which separate TCP data connection is controlled by the user application-sided TCP stack depending on the data volume buffer status reported by the tunnel-sided TCP stack inasmuch as on the one hand intermediate TCP stack units can be implemented at both endpoints of the TCP tunnel connection between both computers, thus making the TCP tunnel connection bi-directionally protected against meltdown problems. On the other hand it is advantageous to implement the at least one intermediate TCP stack unit on a separate computer thus representing a gateway concept between for example private local area network and a global public network like the Internet.

Coming back to the communication system's splitter functionality according to which the splitter is implemented in or associated to at least one of both computers which splitter analyzes the IP data packets to be sent from one of the computers to the other computer as concerns the type of the IP data packets and directs IP data packets of the TCP type to be transmitted over a TCP tunnel and IP data packets of the UDP type to be transmitted over a UDP tunnel, according to which the splitter is implemented as a computer program executable on the at least one computer, or according to which the splitter is implemented in both computers, the invention also refers to method aspects complementing the splitter function by the following method steps for running a communication system according to the invention, strictly speaking for establishing a UDP tunnel within the communication system:

a test IP data packet of the UDP type is sent from a VPN application tunnel endpoint of the first computer via a defined UDP port, in case the VPN application tunnel endpoint of the second computer receives said test IP data packet it sends an acknowledgement reply to the VPN application tunnel endpoint of the first computer, the VPN application tunnel endpoint of the first computer then sends a second acknowledgement reply to the VPN application tunnel endpoint of the second computer, and a bi-directional UDP tunnel is established between the VPN application tunnel endpoints of both computers, over which UDP tunnel IP data packets of the UDP type analyzed by the splitter are transmitted by the splitter.

Aforesaid process routine helps to figure out whether or not any desired UDP tunnel from a remote place, like a WLAN in a hotel via the Internet to a company's LAN is blocked by any firewalls. If this is not the case it is possible to transmit payload data packets which do not underlie serious restrictions as to completeness of the transmission under the UDP protocol which as a rule is better suited for data streaming.

In a preferred embodiment of the invention according to the above-described method for running a communication system according to the invention at least one of said computers is periodically sending keep-alive packets within defined time periods independently from any IP data packets transmitted via the UDP tunnel. These keep-alive packets overcome the problem when there are firewalls in between the UDP tunnel communication which firewalls do some type of network address translation (NAT) and use internal "session-tables" for the established UDP communications leading to a time-out in case the related UDP communication is no longer in use.

According to another preferred embodiment of said method an encryption of the IP data packets of the UDP type transmitted over the established UDP tunnel by means of a Secure Real-time Transport Protocol or Datagram Transport Layer Security Protocol is possible.

Again as already mentioned above further data processing aspects in connection with the intermediate TCP stack unit which includes a tunnel-sided TCP stack and a user application sided TCP stack, which are internally coupled by an internal communication connection, the intermediate TCP stack unit being implemented in at least one of the tunnel endpoints of the TCP tunnel between the TCP tunnel and the TCP stack of the according user application, are reflected by the method for running a communication system in which both user applications are implemented to communicate for an IP data packet exchange via at least the TCP tunnel using the TCP transport protocol based on according TCP stacks and IP stacks on both computers, wherein an intermediate TCP stack unit including a tunnel-sided TCP stack and a user application sided TCP stack, which are internally coupled by an internal communication connection, is implemented in at least one of the tunnel endpoints of the TCP tunnel between the TCP tunnel and the TCP stack of the according user application, wherein the tunnel-sided TCP stack terminates the at least one TCP session, encapsulated by the TCP tunnel in the tunnel endpoint and provides for a data volume buffer, and wherein a separate TCP data connection is present between the user application-sided TCP stack and the TCP stack of the user application which separate TCP data connection is controlled by the user application-sided TCP stack depending on the data volume buffer status reported by the tunnel-sided TCP stack, a communication system in which intermediate TCP stack units are implemented at both endpoints of the TCP tunnel connection between both computers, and a communication system in which the at least one intermediate TCP stack unit is implemented on a separate computer, the method being characterized by the following method steps for avoiding a meltdown of the TCP tunnel:

the TCP stack of the user application sends payload data to the user application-sided TCP stack of the intermediate TCP stack unit, the user application-sided TCP stack sends the payload data to the tunnel-sided TCP stack of the TCP stack unit, which payload data can be buffered by the tunnel-sided TCP stack and/or sent via the TCP tunnel depending on the data volume buffer status, the tunnel-sided TCP stack notifies to the user application-sided TCP stack when no more data can be accepted by the tunnel-sided TCP stack, the user application-sided TCP stack notifies to the TCP stack of the user application to stop sending payload data, the tunnel-sided TCP stack notifies to the user application-sided TCP stack when data can be accepted again, which data volume buffer status is further notified from the user application-sided TCP stack to the TCP stack of the user application, and the TCP stack of the user application restarts sending the payload data to the user application-sided TCP stack without reduced data rate.

By this method the problem of a slow start of data transmission of the TCP stack of the user application as it underlies the "normal" TCP tunnel connection is fully avoided preventing any reduction in the data transmission rate and any meltdown problems. This might become clearer with the help of the detailed description of the preferred embodiments of the invention to which attention is drawn to avoid any double explanations. This is also true for the preferred embodiments of the method in which the user application-sided TCP stack notifies to the TCP stack of the user application to stop sending payload data by means of a "zero window" message, in which the tunnel-sided TCP stack notifies to the user application-sided TCP stack when data can be accepted again by means of a "end zero window", in which the TCP stack of the user application restarts sending the payload data to the user application-sided TCP stack without the use of a "slow start" mechanism, in which the mechanism notifying the data volume buffer status and sending of "zero window"/"end zero window" messages is used to both sides of the intermediate TCP stack unit including the tunnel-sided TCP stack and the user application-sided TCP stack, in which for establishing a data exchange via TCP tunnel only control messages, namely SYN, SYN/ACK and RST are exchanged between the involved TCP stacks of a receiver user application and a sender user application, which message exchange takes place such that after having received a SYN request from the receiver user application through the TCP tunnel connection the tunnel-sided TCP stack sends to the coupled user application-sided TCP stack a SYN request as control message, whereupon the user application-sided TCP stack sends this SYN request to the TCP stack of the sender user application, and the TCP stack of the sender user application sends a SYN/ACK response to the user application-sided TCP stack, what is notified to the tunnel-sided TCP stack, which in turn sends a SYN/ACK message to the TCP stack of the receiver user application, and in which the TCP headers used in the communication between the coupled tunnel-sided TCP stack and user application-sided TCP stack of the intermediate TCP stack unit are modified, in particular are optimized as concerns the maximum segment size of payload data, which also find a complete basis in this detailed description.

Further features, details and advantages of the invention become apparent from the following detailed description of preferred embodiments in accordance with the accompanying drawings.

DESCRIPTION OF THE PREFERRED EMBODIMENTS

Figure 1:
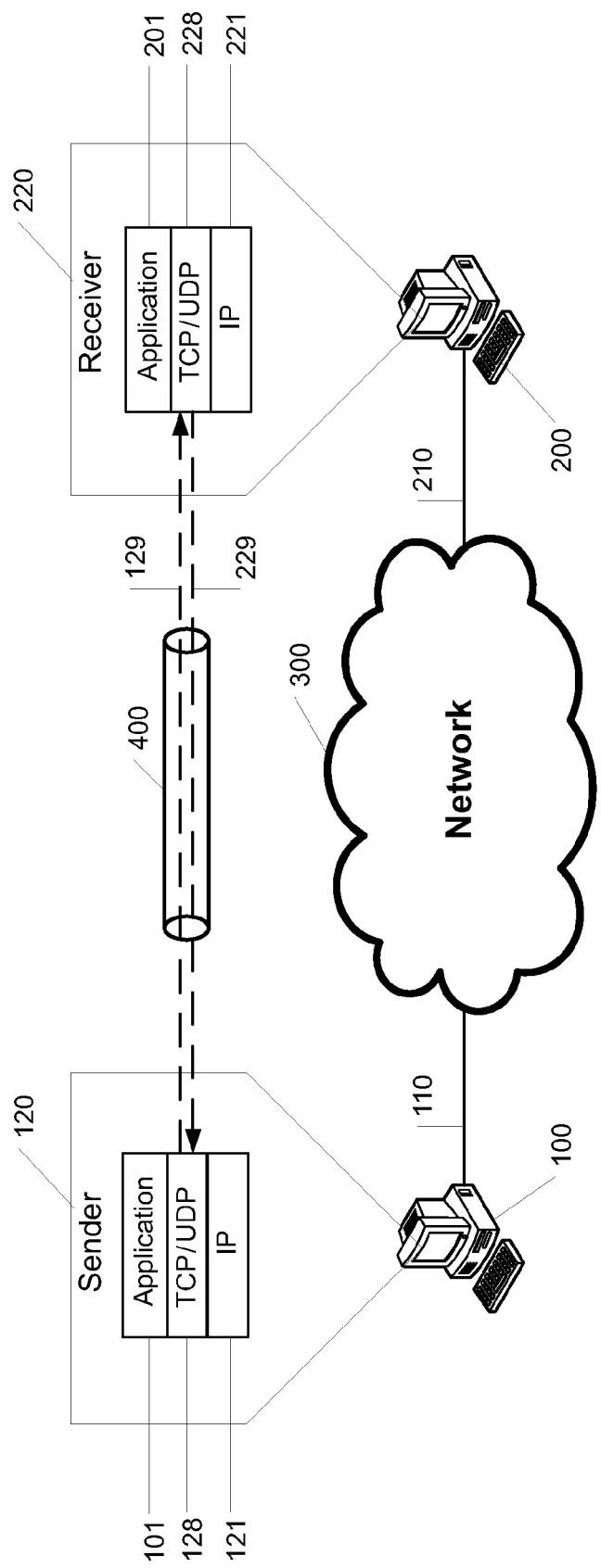
FIGS. 1 and 2 show block diagrams of communication systems according to the prior art.
Figure 2:
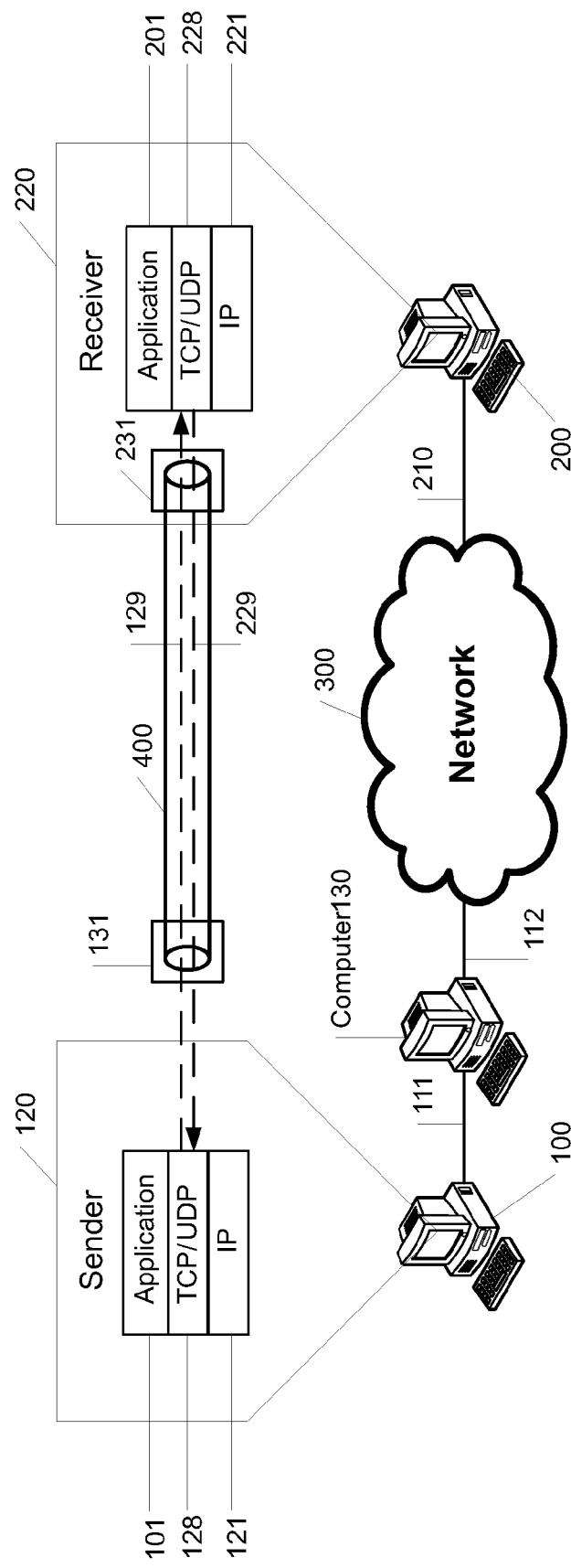

Before turning to the invention again it is worthwhile explaining the background and the general field of the invention referring to FIGS. 1 and 2.

The following predominantly describes a scenario where two applications 101, 201, typically one—101—running on a server computer 100 and the other—201—running on a client computer 200, exchange data over TCP or UDP. These two applications 101, 201 are called "user applications" in this document. More specifically, the application 201 which starts the connection from the user computer 200 is called the "user client application." The application 101 which listens on the server computer 100, waiting for incoming connections, is called the "user server application".

Now turning to FIG. 1 a user client application 201 running on computer 200 communicates with a user server application 101 running on computer 100, using the TCP or UDP transport protocol, which is part of the well-known Internet protocol suite, represented by the TCP/UDP 128 and IP 121 stacks on the sender 120 side, and TCP/UDP 228 and IP 221 stacks on the receiver 220 side, respectively, where both transport layer protocols TCP and UDP are used alternatively, depending on the applications 101/201. Both computers are connected to a network 300 by the physical connections 110 and 210, respectively. The network 300 may represent the public internet or any other IP network.

An important aspect of the described background of the invention is that the mentioned communication data packets sent and received between both computers 100, 200 do not go directly over the network 300, as it would generally be possible, but are encapsulated inside the tunnel 400. While the tunnel 400 exists only once between both computers 100, 200, this tunnel 400 is able to transport any number of communication sessions inside, like sessions 129 and 229, in an encapsulating manner.

FIG. 2 shows another network scenario based on FIG. 1, where the tunnel endpoint 131 at the side of the sender 120 is running on an extra computer 130. This computer 130, which is connected to the network 300 by the physical connection 112, may serve as a VPN gateway for a number of computers like computer 100, running as sender 120. The physical connection 111 between computer 100 and computer 130 represents a Local Area Network (LAN), which is characterized by a high speed and zero packet loss, compared to the connections 112/210 and network 300.

Further on it is to explain that the tunnel endpoint 131 mentioned above is a termination of the VPN tunnel 400 which means that the tunnel endpoint 131 is a software program which handles the data transfer between the local area network represented by computer 130 and the VPN tunnel 400.

Figure 3:
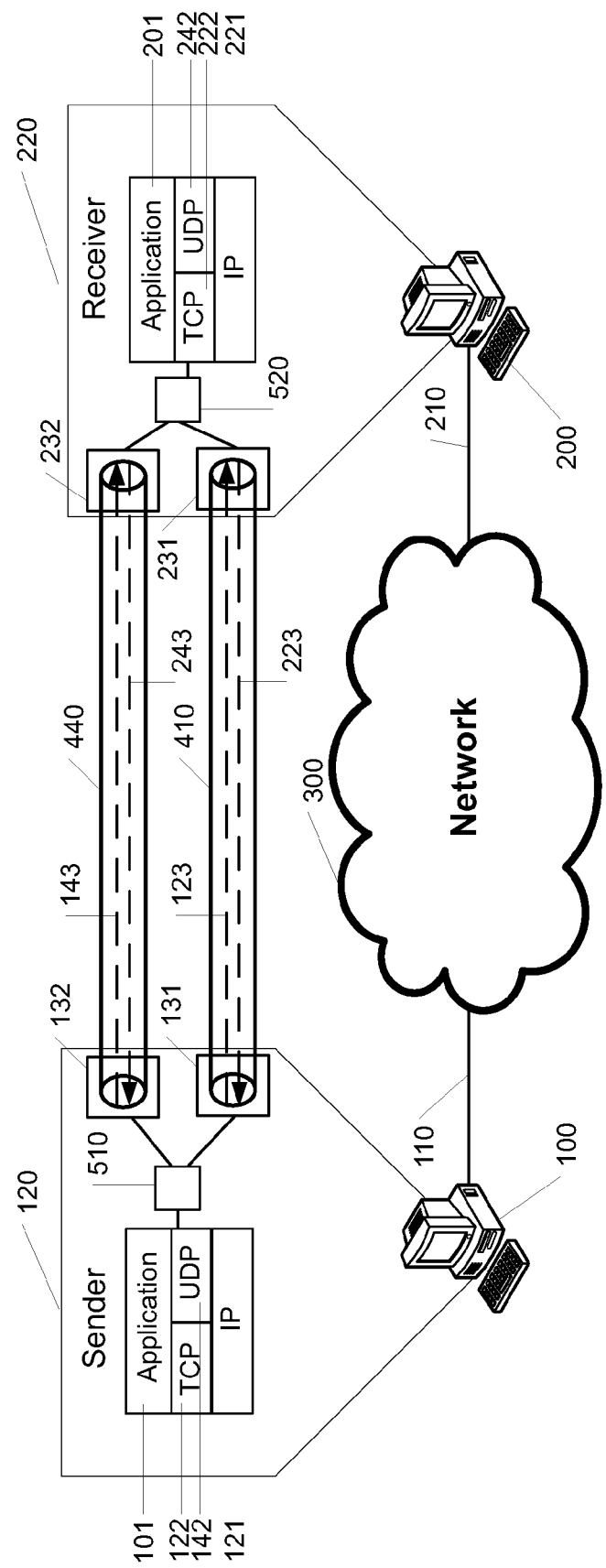
FIG. 3 shows a block diagram of a communication system according to the invention implementing a splitter functionality.

FIG. 3 is a block diagram representation of a network scenario describing one aspect of the disclosed invention, where an application 101 running on computer 100 communicates with another application 201 running on computer 200, using the TCP or UDP transport protocol, which is part of the well-known Internet protocol suite, represented by the TCP 122, UDP 142 and IP 121 stacks on the sender 120 side, and TCP 222, UDP 242 and IP 221 on the receiver 220 side, respectively. Both computers are connected to a network 300 by the physical connections 110 and 210, respectively. The network 300 may represent the public internet, or any other IP network.

Both computers, 100 and 200, are running a Virtual Private Network (VPN) application, which may build up two fully transparent tunnels, namely TCP tunnel 410 and UDP tunnel 440. While the connection-oriented TCP tunnel 410 is intended to transport any TCP or UDP sessions in an encapsulating manner, established between the application 101 running on computer 100 and the application 201 running on computer 200, in either direction, represented by the data streams 123 and 223, optionally in an encrypted and secured manner, the connection-less UDP tunnel 440 is intended to transport some of the UDP data streams in an encapsulating manner, established between the application 101 running on computer 100 and the application 201 running on computer 200, in either direction, represented by the data streams 143 and 243.

As TCP is not well suited to transport the data of real time streaming applications, such as Voice over IP, it may be advantages to use UDP as transport protocol for these real time streaming applications.

When such a said UDP tunnel 440 can be established, this works parallel to the TCP tunnel 410. The TCP tunnel 410 is still used for those types of communication, which can be compressed better when TCP is used as tunnel protocol.

The VPN applications running at both sides, i.e., at the side of the sender 120 and of the receiver 220, build the TCP tunnel endpoints 131/231, and the UDP tunnel endpoints 132/232. The normal user applications 101 and 201 are alternatively using either the TCP/IP protocol stacks 122/121 and 222/221, or the UDP/IP protocol stacks 142/121 and 242/221, respectively.

In order to exchange payload data between the applications 101 and 201, either the TCP half-sessions 123 and 223 are being established, which are in turn encapsulated by the TCP tunnel 410, or the UDP data streams 143 and 243 are being established, which in turn may be encapsulated by the UDP tunnel 440.

To decide whether the payload data are transmitted over the TCP tunnel 410 or the UDP tunnel 440 on each side of the tunnels 410, 440 there is implemented a special logic, the splitters 510, 520, which, as part of the VPN application, decide about each incoming IP packet from the local network or user application 101, 201, whether this IP packet is to be forwarded through the TCP tunnel 410 or through the UDP tunnel 440. Thus the splitter 510 on the sender 120 side and splitter 520 on the receiver 220 side distribute all outgoing packets into one of both tunnels 410 or 440.

The criteria for this decision can simply mean that UDP packets are forwarded through the UDP tunnel, while the remaining packets are forwarded through the TCP tunnel. More sophisticated but well-known techniques can be used as well, for example for VoIP (voice over IP) SIP examining the SDP (Session Description Protocol) to evaluate which UDP ports are used for RTP (RTP: A Transport Protocol for Real-Time Applications, RFC 3550) and sending especially the data for these ports through the UDP tunnel 440.

Before any IP packet is sent into one of both tunnels 410, 440, it is processed by the splitter program 510 or 520, which evaluates this packet and on behalf of this decides which of both tunnels 410, 440 is best suited for this packet, to send it into the appropriate tunnel 410, 440. Since both, the TCP 410 and the UDP tunnel 440, have different characteristics with regards to encryption, compression, time delay and reliability, the splitters 510, 520 perform optimization for the summary of the communication sessions.

A further preferred embodiment of the invention as concerns the process of establishing a UDP tunnel 440 refers to a check method whether or not from a local area network LAN a UDP tunnel can be established to a remote LAN via the Internet:

Before building up the UDP tunnel 440, test IP data packets of the UDP type—so-called UDP discovery packets—are sent from a VPN application tunnel endpoint 132 of the first computer and 100 to explore the network 300 by a three-way exploration. This mostly means to check if any firewalls are blocking UDP traffic.

Thereby, first the newly started tunnel endpoint 132 on e.g. the sender 120 side sends a UDP packet to the receiver 220 side. When the tunnel endpoint 232 receives this UDP discovery packet on the UDP port known to both sides, it sends an acknowledgement reply. The tunnel endpoint 132 receiving this reply can now be sure that UDP traffic is possible in both directions. The tunnel endpoint 132 then sends another UDP packet as second acknowledgement reply. When this is received at the other side by tunnel endpoint 232, now both sides can be sure that UDP tunnel communication is working in both directions. Then, a fully transparent UDP tunnel 440 may be established.

IP packets containing data which are appropriate for compression are preferably sent through the TCP tunnel 410. IP packets containing voice data are preferably sent through the UDP tunnel 440, because this is expected to have the lowest delays, while single packet loss can be accepted.

When encryption is needed for said UDP tunnel 440, SRTP (Secure Real-time Transport Protocol, RFC 3711) or DTLS (Datagram Transport Layer Security, RFC 6347) is used, since both represent a secure transport protocol and have high tolerance to packet loss and re-ordering.

When such a UDP tunnel 440 has been established, both sides need to periodically send keep-alive packets within defined time periods, even if there is no payload traffic from applications 101, 201 to be sent through the UDP tunnel 440. These keep-alive packets are necessary if there are firewalls in between the computer's 100 and 200, respectively and the network 300, which do some type of NAT (network address translation) and have internal tables for the established UDP sessions which generate a time out when no longer in use.

When no UDP tunnel 440 can be established, as was found out by not receiving the UDP discovery packets, all payload data packets to be transmitted between the applications 101, 201 are forwarded over the TCP tunnel 410.

The following description relates to the data exchanged between two applications 101, 201, running on the computers 100 and 200, using the TCP transport protocol, only. According to FIG. 3, the TCP packets of the TCP half-sessions 123 and 223 are encapsulated by the TCP tunnel 410. As explained in the introducing part of the description it is a prior art problem, that TCP meltdown may happen within the data transmission over this TCP tunnel 410, because of the TCP over TCP interference.

Figure 4:
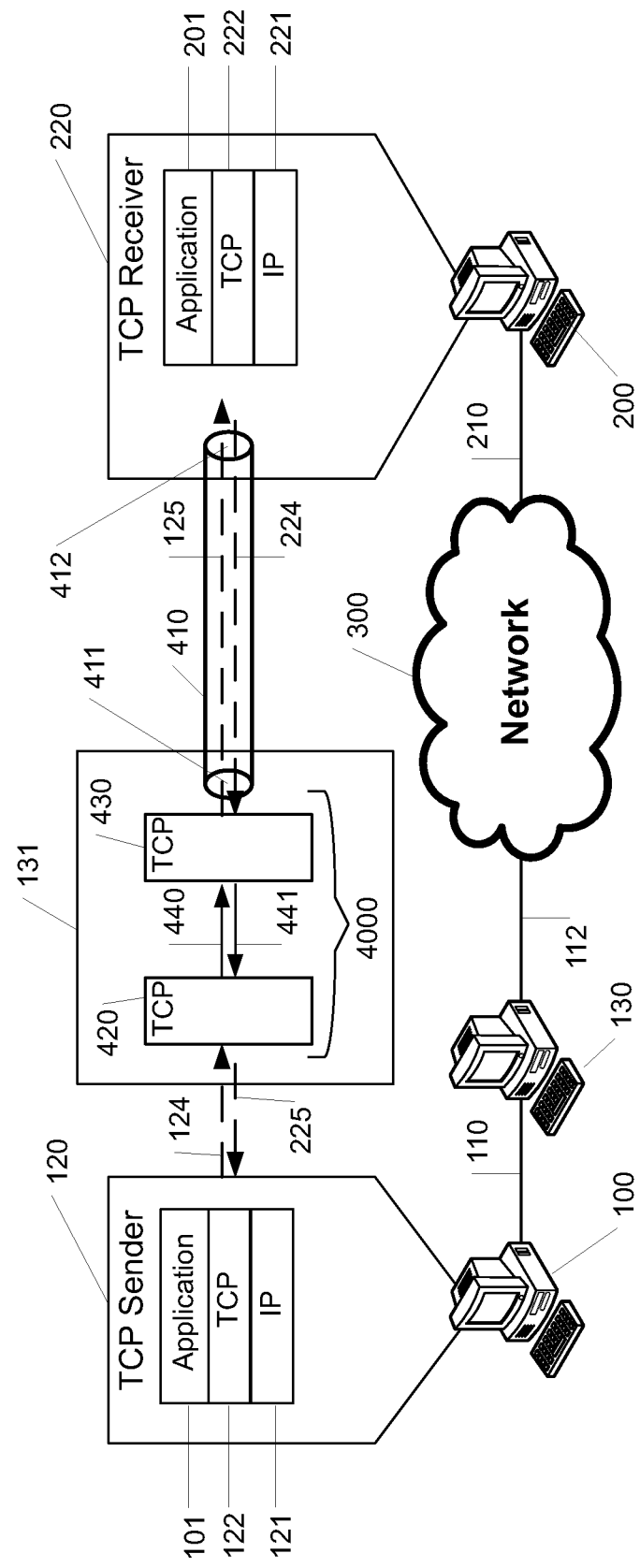
FIG. 4 shows a block diagram of a communication system according to the invention implementing an intermediate TCP stack unit.

The solution of this problem is explained referring to FIG. 4 which is a block diagram representation of a network scenario alternative to the simple tunnel endpoint 131 of FIG. 3. This can be combined with the splitter functionality 510 what, however, is left away in FIG. 4 for sake of clarity.

Now the embodiment of FIG. 4 is related to the sending direction of the TCP stack 122, running on computer 100, which in turn is marked as TCP sender 120. The tunnel endpoint 131 consists not only of the TCP stack 411 of said TCP tunnel, but additionally of an intermediate TCP stack unit 4000 including coupled TCP stacks 420, 430. The TCP stack at the other end of said tunnel 410 is marked by 412. In other words, the TCP tunnel 410 is built by the TCP stacks 411 and 412, which does SSL/TLS for security purpose, while the coupled TCP stacks 420, 430 are inserted additionally. The intermediate TCP stack unit 4000 including the two coupled TCP stacks 420, 430 is implemented in only one tunnel endpoint 131, which may run on an extra computer 130, according to FIG. 4. In another preferred embodiment said coupled TCP stacks may be inserted on both sides of the tunnel 410.

The coupled TCP stacks of the intermediate TCP stack unit 4000 are identified as user application-sided TCP stack 420 and tunnel-sided TCP stack 430, but in the following only the reference numerals 420, 430 are used to differentiate between these two TCP stacks.

In FIG. 4, by inserting the coupled TCP stacks 420, 430, the two TCP half-sessions 129 and 229 of FIG. 2 are each separated into two new TCP half-sessions 124/225 and 125/224, respectively. The new half-sessions 124 and 225 which are a separate TCP data connection between TCP stack 420 and TCP stack 122 of the user application 101, are terminated by the TCP stack 420, while the new TCP half-sessions 125 and 224 are terminated by the TCP stack 430. Both coupled TCP stacks 420 and 430 are exchanging control information and the payload data of the applications 101 and 201 by means of the internal communication channels 440 and 441, respectively, for both directions. The term "termination" in this context means, that the coupled TCP stacks 420, 430 are set in between, like proxies. Said coupled TCP stacks 420, 430 are special TCP implementations, as described later on in this document, as part of the tunnel endpoint 131. According tunnel endpoints may be implemented inside the communicating computers, or in extra gateway computers, like computer 130 in FIG. 4, at one or both sides of the TCP tunnel.

The two coupled TCP stacks 420, 430 terminate/process the TCP protocol going through the TCP tunnel 410, first to the TCP application 122 on the same side of the tunnel (user server application 101), second in the direction to the TCP application 201 on the other side of the tunnel (user client application, 201). The special TCP stack 420 directed to the user server application 101 on the same side of the tunnel 410 uses normal mechanisms, like "zero window", to control the speed of the data transfer in the TCP half-sessions 124, 225.

The tunnel connection 410 is mostly the slowest part of the network, especially when going over the public Internet, while the TCP stack 122 of the application 101 is connected via the half-sessions 124, 225 to the TCP stack 420 of the tunnel endpoint 131 over a LAN 110 or even the tunnel endpoint 131 is on the same computer as the TCP application 122, where there is a high speed and mostly zero packet loss.

To refresh the meltdown problem reference is made again to FIG. 2 or FIG. 3 each without the coupled TCP stacks 420, 430, representing a state of the art TCP tunnel 400/410. TCP meltdown occurs because the sending TCP stack 122, for example, on a computer 100 running a TCP application, does not send data as fast as possible, but needs to try out the connecting bandwidth through a "slow start", getting faster, and reducing the speed of sending data as soon as an alleged packet loss is detected, then again starting to increase the speed through "slow start".

Through the TCP tunnel 410, no packets of the application's TCP half-sessions 123/223 are lost, because TCP is a connection-oriented protocol. When packets of the TCP tunnel 400/410 itself, carrying the TCP packets of the TCP half-sessions 123/223 are lost, this is recognized by the TCP stacks of the tunnel endpoints 131, 231 and the lost packets are re-sent by this tunnel TCP protocol. The TCP connection inside the tunnel 400/410 is not directly aware of these packet losses and the re-sending done by the tunnel endpoints. Only a certain delay in receiving acknowledgments may be noticed, which can be interpreted as packet loss, initiating packet re-sending and "slow start" at TCP stack 122, and so can cause TCP meltdown.

Now referring to FIG. 4 the coupled TCP stacks 420, 430 being inserted, represent the solution for that previously described TCP meltdown problem:

The sending TCP stack 122 of the TCP application 101 is connected to the TCP stack 420 at the tunnel endpoint 131, where the bandwidth is fast. This TCP stack 420 forwards the payload data to the coupled TCP stack 430 through the internal communication 440, as long as payload data can be sent through the tunnel 410. As data is received faster on connection line 110 by TCP stack 420, as can be sent on connection line 112 by the tunnel TCP 411, payload data needs to be buffered by TCP stack 430. TCP stack 420 is notified by TCP stack 430 when no more payload data can be sent through the TCP tunnel 410, or when a certain buffer limit is reached, then in turn TCP 420 sends "zero window" to the applications TCP stack 122, which in turn stops sending.

TCP stack 430, directed to the TCP tunnel 410, is also coupled with the TCP stack 411 of the tunnel 410, and so knows when payload data can (again) be sent through this TCP tunnel 410, or when the buffered data is (again) below this certain limit. So the TCP stack 430 does not use slow start or the other mechanisms of normal TCP stacks. Instead, as notified by the TCP stack 411 of the tunnel 410, that payload data can be sent, it always immediately sends the data received from TCP stack 420 into the tunnel 410.

According to FIG. 4 in the sending direction from the sending computer 100 to the receiving computer 200, the two terminating TCP stacks 420, 430 in one TCP tunnel endpoint (131) are coupled as follows:

When the first TCP stack 420 has received payload data, it forwards these data to the second TCP stack 430 of the intermediate TCP stack unit 4000, which in turn tries to send these data through the tunnel 410 to the receiving TCP stack 412 at the other side of the tunnel 410, which normally has a lower speed compared to the speed on the connection 110 between the sender TCP stack 122 and the first of the coupled TCP stacks 420. When in this direction a certain buffer limit is exceeded in the second coupled TCP stack 430 for the buffered receive data, the first receiving TCP stack 420 is notified and in turn sends "zero window" to the sending TCP stack 122 of the sending application 101. Then the sending TCP stack 122 stops sending.

When some of the buffered data in TCP 430 has been sent into the tunnel 410 and less data are buffered than the limit, the receiving TCP stack 420 is again notified by TCP stack 430, and TCP stack 420 sends the status information "end zero window" to the sending TCP 122, which then immediately can send further payload data with high speed, sent by the application 101 of that sending computer 100, without the use of the "slow start" mechanism, i.e. without reduced data rate.

Summarizing the aforesaid data transmission concept the tunnel-sided TCP stack 420 terminates the at least one TCP tunnel connection 410 in the tunnel endpoint 131 and provides for a data volume buffer, whereas a separate TCP data connection 124, 225 is present between the user application-sided TCP stack 420 and the TCP stack 122 of the user application 101 which separate TCP data connection 124, 225 is controlled by the user application-sided TCP stack 420 depending on the data volume buffer status reported by the tunnel-sided TCP stack 430.

The following special functionality as a further preferred embodiment of the invention is also included in the coupled TCP stacks (420, 430) for the TCP session establishment:

A TCP session starts with the client 220 sending a packet with the SYN flag being set in the TCP header. The receiving TCP stack 122 normally replies with SYN/ACK. The receiving TCP stack 122 can also reply with RST when no application is listening on the destination TCP port.

When, referring to FIG. 4, the tunnel-sided TCP stack 430 receives a SYN from the TCP stack 222 of the receiving computer (client) 200 and replies with SYN/ACK, then the client TCP application 222 is notified and the session, represented by the half-sessions 125/224, is established.

But maybe the coupled TCP stack 420 cannot establish a TCP session with the TCP stack 122 at the destination computer 100, because either there is no reply sent by TCP stack 122 to the SYN packet, or there is an RST sent as reply. For that reason, the TCP stack 430 does not reply to a SYN request, received from TCP 222 through the tunnel 410, directly, instead it sends this to the coupled TCP stack 420 as a control message. Now the coupled TCP stack 420 sends a SYN (request) to the target TCP stack 122 and waits for a SYN/ACK reply. When this reply is received, the coupled TCP stack 430 is notified and this then sends a SYN/ACK to the initiating TCP stack 222. In case when an RST reply is received from TCP stack 122, then this RST is forwarded to TCP stack 222.

In general, the TCP stacks 420, 430 do not reply to a SYN request directly, instead they send this to the coupled TCP stack 420/430 as a control message. Now the coupled TCP stack 420 sends a SYN request to the destination computer 100 and waits for a reply. When this reply is received, the other coupled TCP stack 430 is notified and this then sends this reply (SYN/ACK or RST) to the initiating TCP stack 222.

In this way, SYN, SYN/ACK and RST are passed as control messages between the coupled TCP stacks. Not the complete received TCP header is exchanged, but only the control information like SYN or SYN/ACK.

Other fields of the TCP header may differ for the coupled TCP stacks 420, 430. For example, the MSS (maximum segment size) may be optimized. When the coupled TCP stacks 420, 430 are implemented on both sides of the TCP tunnel 410, the MSS may be enlarged for packets sent through the TCP tunnel. Enlargement of the MSS results in improved performance since less header information needs to be transmitted for the total data being exchanged.

What is claimed is:

1. A communication system for transmitting data under a tunnel protocol between at least two computers via a wide area network, said system comprising:
   a first computer running a first user application and a virtual private network application which is designed to build up TCP (Transmission Control Protocol) and UDP (User Datagram Protocol) tunnels with according tunnel endpoints,
   a second computer running a second user application and a VPN (Virtual Private Network) application which again is designed to build up TCP and UDP tunnels with according tunnel endpoints, and
   a wide area network to which the first and second computers are connected by physical connections,
   wherein the first and second user applications are implemented to communicate for an IP (Internet Protocol) data packet exchange via at least one of the TCP tunnels and the UDP tunnel using at least one of a TCP and a UDP transport protocol based on according TCP, UDP and IP stacks on the first and second computers,
   the system further comprising:
   a splitter which is one of implemented in and associated to at least one of the first and second computers which splitter analyzes the IP data packets to be sent from one of the computers to the other computer as concerns a type of the IP data packets and directs IP data packets of the TCP type to be transmitted over a TCP tunnel and IP data packets of the UDP type to be transmitted over a UDP tunnel,
   wherein the first and second user applications are implemented to communicate for an IP data packet exchange via at least the TCP tunnel using the TCP transport protocol based on according TCP stacks and IP stacks on the first and second computers, wherein an intermediate TCP stack unit including a tunnel-sided TCP stack and a user application sided TCP stack, which are internally coupled by an internal communication connection, is implemented in at least one of the tunnel endpoints of the TCP tunnel between the TCP tunnel and the TCP stack of the according user application,
   the tunnel-sided TCP stack terminates the at least one TCP session, encapsulated by the TCP tunnel in the tunnel endpoint and provides for a data volume buffer, and
   a separate TCP data connection is present between the user application-sided TCP stack and the TCP stack of the user application which separate TCP data connection is controlled by the user application-sided TCP stack depending on a data volume buffer status reported by the tunnel-sided TCP stack.

2. A communication system according to claim 1, wherein the splitter is implemented as a computer program executable on the at least one computer.

3. A communication system according to claim 1, wherein a splitter is implemented in the first and second computers.

4. A communication system according to claim 1, wherein intermediate TCP stack units are implemented at both endpoints of the TCP tunnel connection between the first and second computers.

5. A communication system according to claim 1, wherein the at least one intermediate TCP stack unit is implemented on a separate computer.

6. A method for running a communication system for transmitting data under a tunnel protocol between at least two computers via a wide area network, said system comprising
- a first computer running a first user application and a virtual private network application which is designed to build up TCP (Transmission Control Protocol) and UDP (User Datagram Protocol) tunnels with according tunnel endpoints,
- a second computer running a second user application and a VPN (Virtual Private Network) application which again is designed to build up TCP and UDP tunnels with according tunnel endpoints, and
- a wide area network to which the first and second computers are connected by physical connections,
- wherein the first and second user applications are implemented to communicate for an IP (Internal Protocol) data packet exchange via at least one of the TCP tunnels and the UDP tunnel using at least one of a TCP and a UDP transport protocol based on according TCP, UDP and IP stacks on the first and second computers,
- comprising a splitter which is one of implemented in and associated to at least one of the first and second computers which splitter analyzes the IP data packets to be sent from one of the computers to the other computer as concerns a type of the IP data packets and directs IP data packets of the TCP type to be transmitted over a TCP tunnel and IP data packets of the UDP type to be transmitted over a UDP tunnel, the method comprising following method steps for establishing a UDP tunnel within a communication system:
- a test IP data packet of the UDP type is sent from a VPN application tunnel endpoint of the first computer via a defined UDP port,
- in case the VPN application tunnel endpoint of the second computer receives said test IP data packet it sends an acknowledgement reply to the VPN application tunnel endpoint of the first computer,
- the VPN application tunnel endpoint of the first computer then sends a second acknowledgement reply to the VPN application tunnel endpoint of the second computer, and
- a bi-directional UDP tunnel is established between the VPN application tunnel endpoints of the first and second computers, over which UDP tunnel IP data packets of the UDP type analyzed by the splitter are transmitted by the splitter.

7. A method according to claim 6, wherein at least one of said computers is periodically sending keep-alive packets within defined time periods independently from any IP data packets transmitted via the UDP tunnel.

8. A method according to claim 6, comprising an encryption of the IP data packets of the UDP type transmitted over the established UDP tunnel by means of one of a Secure Real-time Transport Protocol and a Datagram Transport Layer Security Protocol.

9. A method in particular according to claim 6 for running a communication system wherein the first and second user applications are implemented to communicate for an IP data packet exchange via at least the TCP tunnel using the TCP transport protocol based on according TCP stacks and IP stacks on the first and second computers, wherein
- an intermediate TCP stack unit including a tunnel-sided TCP stack and a user application sided TCP stack, which are internally coupled by an internal communication connection, is implemented in at least one of the tunnel endpoints of the TCP tunnel between the TCP tunnel and the TCP stack of the according user application,
- the tunnel-sided TCP stack terminates the at least one TCP session, encapsulated by the TCP tunnel in the tunnel endpoint and provides for a data volume buffer, and
- a separate TCP data connection is present between the user application-sided TCP stack and the TCP stack of the user application which separate TCP data connection is controlled by the user application-sided TCP stack depending on a data volume buffer status reported by the tunnel-sided TCP stack, the method comprising following method steps for avoiding meltdown of the TCP tunnel:
- the TCP stack of the user application sends payload data to the user application-sided TCP stack of the intermediate TCP stack unit,
- the user application-sided TCP stack sends the payload data to the tunnel-sided TCP stack of the TCP stack unit, which payload data can at least one of be buffered by the tunnel-sided TCP stack and sent via the TCP tunnel depending on the data volume buffer status,
- the tunnel-sided TCP stack notifies to the user application-sided TCP stack when no more data can be accepted by the tunnel-sided TCP stack,
- the user application-sided TCP stack notifies to the TCP stack of the user application to stop sending payload data,
- the tunnel-sided TCP stack notifies to the user application-sided TCP stack when data can be accepted again, which data volume buffer status is further notified from the user application-sided TCP stack to the TCP stack of the user application, and
- the TCP stack of the user application restarts sending the payload data to the user application-sided TCP stack without reduced data rate.

10. A method according to claim 9, wherein the user application-sided TCP stack notifies to the TCP stack of the user application to stop sending payload data by means of a "zero window" message.

11. A method according to claim 9, wherein the tunnel-sided TCP stack notifies to the user application-sided TCP stack when data can be accepted again by means of a "end zero window".

12. A method according to claim 9, wherein the TCP stack of the user application restarts sending the payload data to the user application-sided TCP stack without the use of a "slow start" mechanism.

13. A method according to claim 9, wherein the mechanism notifying the data volume buffer status and sending of "zero window"/"end zero window" messages is used to the first and second sides of the intermediate TCP stack unit including the tunnel-sided TCP stack and the user application-sided TCP stack.

14. A method according to claim 9, wherein for establishing a data ex-change via TCP tunnel only control messages, namely SYN (Synchronize Control Flag), SYN/ACK (Acknowledge) and RST (Reset) are exchanged between the involved TCP stacks of an receiver user application and a sender user application, which message exchange is the following:
- after having received a SYN request from the receiver user application through the TCP tunnel connection the tunnel-sided TCP stack sends to the coupled user application-sided TCP stack a SYN re-quest as control message, thereupon the user application-sided TCP stack sends this SYN re-quest to the TCP stack of the sender user application, the TCP stack of the sender user application sends a SYN/ACK response to the user application-sided TCP stack, what is notified to the tunnel-sided TCP stack, which in turn sends a SYN/ACK message to the TCP stack of the receiver user application.

15. A method according to claim 9, wherein TCP headers used in the communication between the coupled tunnel-sided TCP stack and user application-sided TCP stack of the intermediate TCP stack unit are modified as concerns a maximum segment size of payload data.

16. A method according to claim 15, wherein the TCP headers used in the communication between the coupled tunnel-sided TCP stack and user application-sided TCP stack of the intermediate TCP stack unit are optimized as concerns the maximum segment size of payload data.

* * * * *